United States Patent
Beslin

(10) Patent No.: US 9,551,802 B2
(45) Date of Patent: Jan. 24, 2017

(54) DEFOCUSING BEAMFORMER METHOD AND SYSTEM FOR A TOWED SONAR ARRAY

(75) Inventor: Olivier Beslin, Eastern Passage (CA)

(73) Assignee: ULTRA ELECTRONICS MARITIME SYSTEMS INC., Dartmouth (CA)

( * ) Notice: Subject to any disclaimer, the term of this patent is extended or adjusted under 35 U.S.C. 154(b) by 948 days.

(21) Appl. No.: 13/822,595

(22) PCT Filed: Sep. 13, 2010

(86) PCT No.: PCT/CA2010/001394
§ 371 (c)(1),
(2), (4) Date: May 15, 2013

(87) PCT Pub. No.: WO2012/034205
PCT Pub. Date: Mar. 22, 2012

(65) Prior Publication Data
US 2013/0223186 A1 Aug. 29, 2013

(51) Int. Cl.
*G01V 1/38* (2006.01)
*G01S 15/00* (2006.01)
(Continued)

(52) U.S. Cl.
CPC ............ *G01V 1/3861* (2013.01); *G01S 15/42* (2013.01); *G10K 11/346* (2013.01)

(58) Field of Classification Search
USPC ........................................... 367/106
See application file for complete search history.

(56) References Cited

U.S. PATENT DOCUMENTS 4,213,195 A * 7/1980 Pridham .................. G01S 15/74
367/105
4,290,123 A * 9/1981 Pickens .................. G01V 13/00
367/13
(Continued)

FOREIGN PATENT DOCUMENTS

DE 19743096 C1 1/1999
FR 2651950 A1 3/1991
(Continued)

OTHER PUBLICATIONS

Thales, "CAPTAS Nano: A new sonar for ASW in the littorals", received Mar. 8, 2013, pp. 1-4, France.
(Continued)

*Primary Examiner* — James Hulka
(74) *Attorney, Agent, or Firm* — Hanley, Flight & Zimmerman, LLC

(57) ABSTRACT

A method and towed sonic array system for defocusing the beampattern of the towed sonic array. The method includes determining an amplitude adjustment and a phase adjustment for each of the sonic projectors; and driving each of the sonic projectors with a drive signal modified by the amplitude adjustment and the phase adjustment for that sonic projector. The amplitude adjustment and phase adjustment for each of the sonic projectors are, at least in part, based upon the distance from that sonic projector to a virtual source. The location of the virtual source may be selected so as to achieve different beampatterns, including wide-sector beams and, in at least one case, a near-omni-directional beampattern. The drive signal may include multiple frequency components, in which case the method may be used to find a set of beamformer coefficients for each of the frequency components and an inverse transform may be used to realize a defocused driving signal.

16 Claims, 18 Drawing Sheets

(51) Int. Cl.
*G01S 15/42* (2006.01)
*G10K 11/34* (2006.01)

(56) References Cited

U.S. PATENT DOCUMENTS

| | | | | |
|---|---|---|---|---|
| 4,476,553 | A * | 10/1984 | Ziolkowski | G01V 13/00 |
| | | | | 181/110 |
| 4,868,794 | A * | 9/1989 | Ziolkowski | G01V 13/00 |
| | | | | 181/118 |
| 4,932,007 | A | 6/1990 | Suomala | |
| 5,058,082 | A * | 10/1991 | Bertheas | G01V 1/201 |
| | | | | 367/12 |
| 5,309,409 | A * | 5/1994 | Jones | G01S 3/46 |
| | | | | 367/103 |
| 5,856,954 | A | 1/1999 | Grall | |
| 6,683,819 | B1 | 1/2004 | Estaphan et al. | |
| 6,778,468 | B1 * | 8/2004 | Nishimori | B06B 1/0633 |
| | | | | 367/103 |
| 6,901,029 | B2 | 5/2005 | Raillon et al. | |
| 2004/0000446 | A1 * | 1/2004 | Barber, Sr. | G01V 1/3808 |
| | | | | 181/120 |
| 2004/0125701 | A1 * | 7/2004 | Raillon | G01V 1/04 |
| | | | | 367/106 |
| 2007/0070814 | A1 | 3/2007 | Frodyma et al. | |
| 2008/0056069 | A1 | 3/2008 | Doisy et al. | |
| 2008/0137482 | A1 * | 6/2008 | Kang | G01S 7/52028 |
| | | | | 367/103 |
| 2011/0164466 | A1 * | 7/2011 | Hald | G01H 3/125 |
| | | | | 367/8 |

FOREIGN PATENT DOCUMENTS

| | | |
|---|---|---|
| FR | 2822960 A1 | 10/2002 |
| GB | 2366617 A | 3/2002 |
| WO | 02079806 A1 | 10/2002 |

OTHER PUBLICATIONS

Patent Cooperation Treaty, International Search Report issued in connection with International Application No. PCT/FR02/01108, Jun. 17, 2002, pp. 1-4.

Patent Cooperation Treaty, International Search Report issued in connection with International Application No. PCT/CA2010/001394, Jun. 7, 2011, pp. 1-3.

Patent Cooperation Treaty, "International Preliminary Report on Patentability", issued in connection with PCT Application No. PCT/CA20101001394, issued on Mar. 19, 2013, 6 pages.

Patent Cooperation Treaty, "Written Opinion", issued in connection with PCT Application No. PCT/CA2010/001394, issued on Jun. 7, 2011, 5 pages.

Patent Cooperation Treaty, "International Preliminary Report on Patentability", issued in connection with PCT Application No. PCT/FR2002/001108, issued on Mar. 31, 2003, 4 pages.

* cited by examiner

US 9,551,802 B2

DEFOCUSING BEAMFORMER METHOD AND SYSTEM FOR A TOWED SONAR ARRAY

RELATED APPLICATION

This patent is a national stage of PCT Application Serial No. PCT/CA2010/001394, which was filed on Sep. 13, 2010. Priority is claimed to PCT Application Serial No. PCT/CA2010/001394. PCT Application Serial No. PCT/CA2010/001394 is hereby incorporated herein by reference in its entirety.

FIELD OF THE INVENTION

The present invention relates to towed sonar arrays and, in particular, methods and systems for defocusing the beampattern created by a towed sonar array having a plurality of projectors arranged as a linear array.

BACKGROUND OF THE INVENTION

Towed linear arrays of receivers have been successfully used in marine operations for both passive and active sonar. At times, a horizontal receiver array is used with a vertical line array of projectors. At other times, the projector array may also be horizontal. In some cases, the horizontal projectors array and horizontal receiver array are linearly arranged on the same tow line. In some cases, the receiver array may be positioned aft of the projector array. In some cases, the receivers may be interspersed with the projectors, such that the arrays are intermeshed.

The natural beam pattern of a linear projector array, when driving all projectors with the same voltage signal, is a narrow focused beam perpendicular to the array, termed the "broadside beam". In order to insonify a full 360-degrees of azimuthal coverage, the control system driving the projectors tries to "sweep" the natural beam from, for example, a forward end-fire pattern through broadside to an aft end-fire pattern. The beam may be rotated through azimuth by adjusting the timing (phase) of the drive signals for the projectors. The focused nature of the beamwidth places limits on the ping repetition rate.

BRIEF DESCRIPTION OF THE DRAWINGS

Reference will now be made, by way of example, to the accompanying drawings which show embodiments of the present invention, and in which.

Similar reference numerals are used in different figures to denote similar components.

DESCRIPTION OF SPECIFIC EMBODIMENTS

In one aspect, the present invention provides towed sonic array system. The system includes a linear array of sonic projectors; a linear array of receivers; and a control system configured to drive the sonic projectors. The control system is configured to drive each of the sonic projectors with a drive signal modified by an amplitude adjustment and a phase adjustment for that sonic projector. The amplitude adjustment and phase adjustment for each of the sonic projectors are, at least in part, based upon the distance from that sonic projector to a virtual source.

In another aspect, the present invention provides a method of defocusing the beampattern of a towed sonic array, the towed sonic array including a linear array of sonic projectors and a linear array of receivers. The method includes determining an amplitude adjustment and a phase adjustment for each of the sonic projectors; and driving each of the sonic projectors with a drive signal modified by the amplitude adjustment and the phase adjustment for that sonic projector. The amplitude adjustment and phase adjustment for each of the sonic projectors are, at least in part, based upon the distance from that sonic projector to a virtual source.

Other aspects and features of the present invention will be apparent to those of ordinary skill in the art from a review of the following detailed description when considered in conjunction with the drawings.

Figure 1:
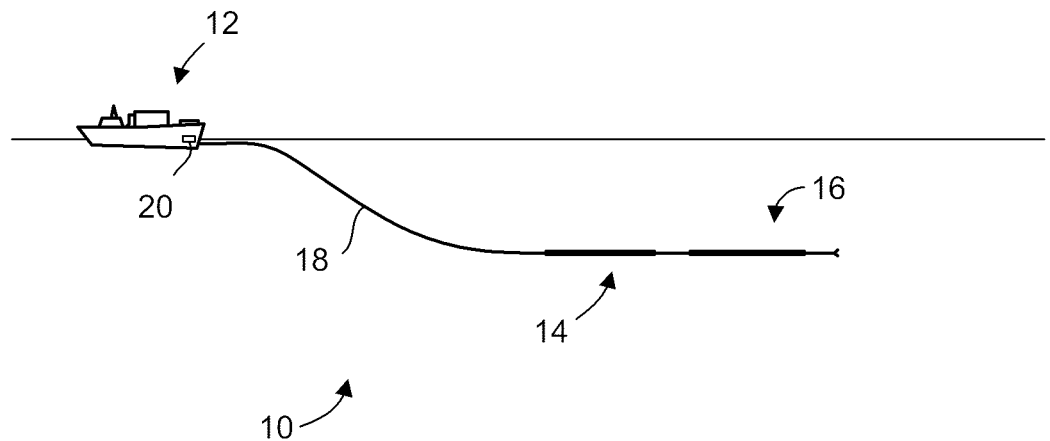
FIG. 1 diagrammatically shows a towed sonic array.

Reference is first made to FIG. 1, which diagrammatically shows a towed sonic array 10. The towed sonic array 10 is deployed from a ship 12, typically using a winch and, in some cases, through a hull penetrator.

The towed sonic array 10 includes a linear array of sonic projectors 14 and a linear array of receivers 16. In this embodiment, the array of projectors 14 and array of receivers 16 share a common axis, which may be referred to as an endfire axis. The towed sonic array 10 is deployed using a tow line 18, which includes cables for driving the projectors 14 and for receiving signals detected by the receivers 16. In some embodiments, the cables may include electrical cables, fibre optic cables, or both. The ship 12 includes a control system 20, which is configured to generate the drive signals for driving the sonic projectors 14 and for receiving, amplifying and analyzing the signals detected by the receivers 16.

Figure 2:
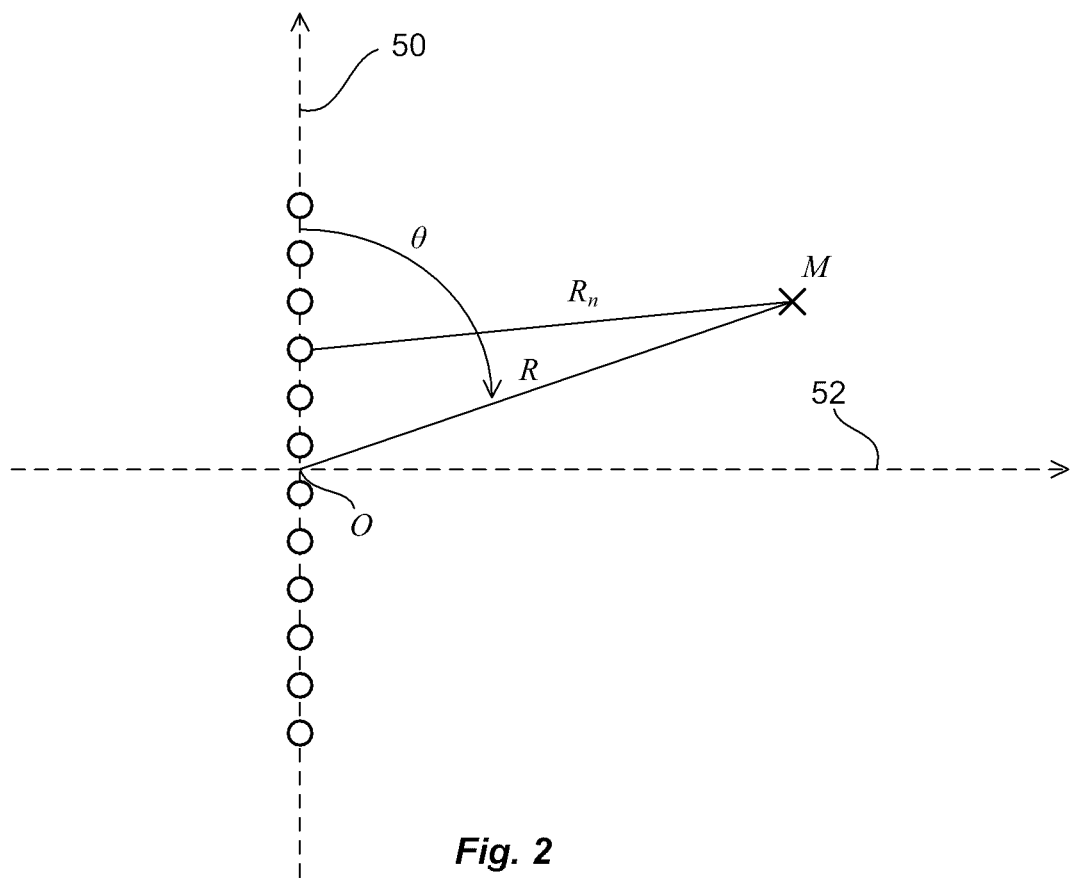
FIG. 2 diagrammatically illustrates the geometry of the linear array of sonic projectors.

Reference is now made to FIG. 2, which diagrammatically illustrates the geometry of the linear array of sonic projectors 14. The geometry of the sonic projectors 14 in this example illustration is defined with respect to an endfire axis 50 and a perpendicular broadside axis 52.

The plane defined by the endfire axis 50 and broadside axis 52 is parallel to the sea surface, at a given operational depth. The N sonic projectors are aligned along the endfire axis 50. The array midpoint is referred to as the array center O. The broadside axis 52 crosses the endfire axis 50 at the array center O. The radiated acoustic pressure is a function of time t and space denoted p(M,t), where M is a current observation point in space. The relative position of M is defined by its range R and bearing θ relative to the array center O. The bearing θ is defined as the angle between the endfire axis (oriented in the tow direction) and the vector $\overrightarrow{OM}$. In FIG. 2, the bearing θ is clockwise oriented and spans the [0-360] degrees angular range. $R_n$ denotes the distance between the projector n (n=1 to N) and the observation point M. The convention used herein is that the number of the projectors begins with n=1 at the aft-most projector (bottom of the diagram), and n=N at the foremost projector (top of the diagram).

For clarity of illustration, the defocusing process described below will detail the simple harmonic case in which the projectors are driven by a pure sinusoidal signal of frequency f. As will be explained further below, the process is generally applicable to any driving waveform. In particular, a spectral transform, such as a Fourier transform, may be used to separate the waveform into its waveform frequency components. The defocusing process may then be applied to each of the components. Then, by taking the inverse spectral transform (e.g. an Inverse Fourier Transform) of all adjusted frequency components, the defocused driving waveform is realized.

When projector dimensions are small compared to the acoustic wavelength λ, (λ=c/f, where c is the speed of sound in water), the sonic projector can be considered omnidirectional. Each projector is then characterized by its time varying Volume Flow $q_n(t)$. This volume flow corresponds to the volume rate at which fluid is introduced or withdrawn by the acoustic source. Considering a projector harmonic motion at frequency f, the volume flow can be expressed as:

$$q_n(t) = Q_n \cos(\omega t + \phi_n) \quad (1)$$

In Equation (1), $Q_n$ is the amplitude of projector n volume flow; ω is the projector angular frequency, which is given by 2πf; and $\phi_n$ is the phase of the volume flow for projector n.

Using complex notation, the harmonic projector volume flow can be expressed as:

$$q_n(t) = Re(\overline{Q}_n e^{j\omega t}) \quad (2)$$

In Equation (2), the complex volume flow $\overline{Q}_n$ is defined by:

$$\overline{Q}_n = Q_n e^{j\phi_n} \quad (3)$$

Similarly, the complex acoustic pressure $\overline{p}(M)$ may be expressed as:

$$p(M,t) = Re(\overline{p}(M) e^{j\omega t}) \quad (4)$$

The acoustic radiation of a N-element linear horizontal projector array, such as array 14 (FIG. 1), can be described by the following equation:

$$\overline{p}(M) = \sum_{n=1}^{N} j\rho\omega \overline{Q}_n \frac{e^{-ikR_n}}{4\pi R_n} \quad (5)$$

In Equation (5), ρ represents the fluid density and k represents the wave vector, where k=2π/λ. It will be appreciated from Equation (5) that radiated acoustic pressure at observation point M is a function of projector volume flows $\overline{Q}_n$ and the propagation term $$\frac{e^{-ikR_n}}{R_n}.$$

The amplitude of the resulting pressure at an observation point thus depends on interference effects mainly driven by volume flow and propagating term phases. The present inventors have determined that volume flow phases can be controlled through controlling the projector driving voltages. Propagation term phases are function of R and θ. In the far field of the array, the range dependence is negligible and propagation term phases depend only on θ. The array far field range is defined by the following formula, where L is the array length:

$$R \gg \frac{L^2}{2\lambda} \quad (6)$$

The array radiation directivity may be characterized by its radiation beampattern defined by:

$$B(\theta) = 20 \text{Log}_{10}\left(\frac{|\overline{p}(\theta)|}{|\overline{p}(\theta_{max})|}\right) \quad (7)$$

In Equation (7), the term $|\overline{p}(\theta)|$ represents the module of the complex acoustic pressure radiated in direction θ in the array far field, and $\theta_{max}$ is the bearing angle at which the radiated pressure is maximum.

When all projector volume flows are identical, the array works on its "natural mode", meaning that no special treatment is made on the array channels (all projectors are treated equally with the same driving voltage). In this configuration, the array beampattern is called the "natural beam" or "broadside natural beam" or the like. In such a scenario, the complex volume flows defined in Equation (3) are reduced to:

$$\begin{cases} Q_n \equiv Q_0 \\ \varphi_n \equiv \varphi_0 \end{cases} \text{for all } n \qquad (8)$$

Figure 3:
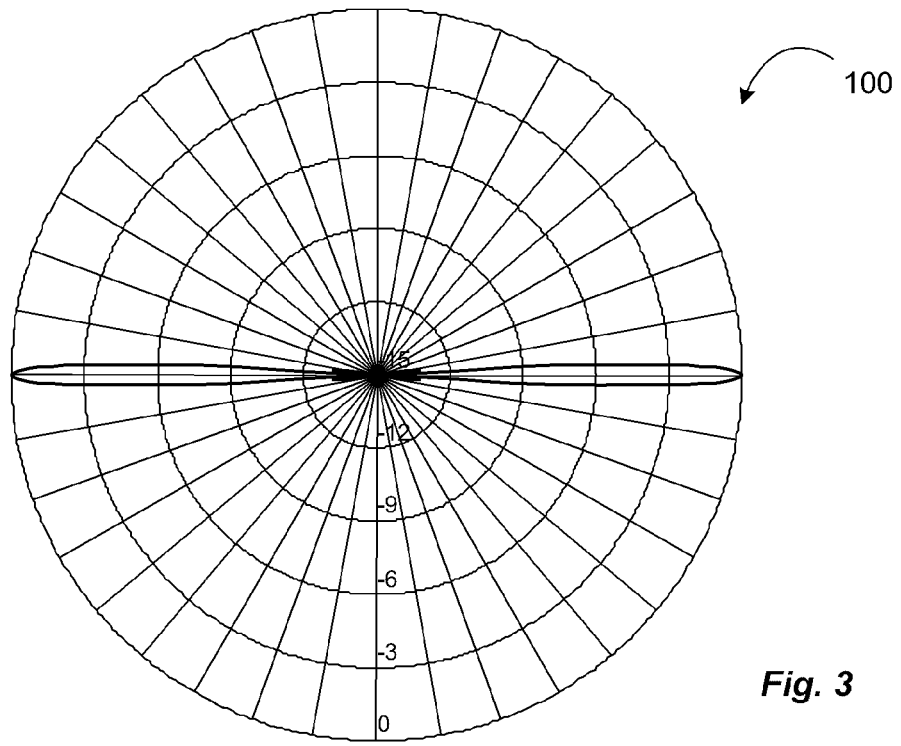
FIG. 3 shows a plot of a broadside natural beampattern.

FIG. 3 shows a polar plot 100 of an example natural beam. It will be noted that the beam is tightly focused with a very narrow beamwidth centered on the broadside axis. It can be seen that when all projectors are driven in phase, with the same amplitude, the array natural beam is aligned along the broadside direction, focusing energy in a narrow sector.

The present application proposed a beamformer method and system that "defocuses" the beampattern in order to isonify a broader sector. In one embodiment the beampattern may be defocused enough to be near-omnidirectional. In another embodiment, the beampattern may be defocused enough to isonify a large sector, which, when combined with beam-steering, allows for the beam to be "swept" more quickly across a full desired range. In yet a further embodiment, the beampattern may be dynamically widened or focused depending on the application and extent to which an operator desires to focus upon a particular sector or, conversely, avoid isonifying a particular sector/location.

To better understand the principles upon which the defocusing beamformer method and system are based, the present concept of beamforming will be discussed below from the point-of-view of the frequency-domain.

A beamformer may be defined in the frequency domain using a set of complex coefficients $\overline{B}_n$ as follows:

$$\overline{B}_n = B_n e^{j\phi_n}, \ B_n \in [0,1], \ \phi_n \in [0,360] \qquad (9)$$

These beamformer coefficients may be used to "scale and phase" each projector volume flow by multiplying a reference volume flow $Q_0$ as follows:

$$\overline{Q}_n = \overline{B}_n Q_0 \qquad (10)$$

Reference will now be made to Huygens Principle. Huygens Principle states that when a wave propagates, any point on a wave front may be regarded as a secondary point source. The sum of all contributions from such secondary point sources emanating from the wave front is the same as the wave front itself. Huygens Principle explains many diffraction and interference phenomenon, the most known being the diffraction of a plane wave through a baffled aperture. When a plane wave passes through a small aperture (i.e. of the order of an acoustic wavelength) in an infinite rigid baffle, the aperture acts as a distribution of secondary omnidirectional sources, spreading curved front waves on the other side of the baffle.

The present inventors have determined that the array projectors can be used to emulate a front wave generated by a virtual source. Generating any type of wave front using Huygens Principle would require a large number of closely spaced projectors spanning an infinite two-dimensional surface. Although a towed sonic array is not an infinite linear array, the towed sonic array may emulate diffraction through a baffled slot using Huygens Principle, where the infinite rigid planar baffle is perpendicular to the broadside direction and the slot spatial extension is in coincidence with the array location.

Figure 4:
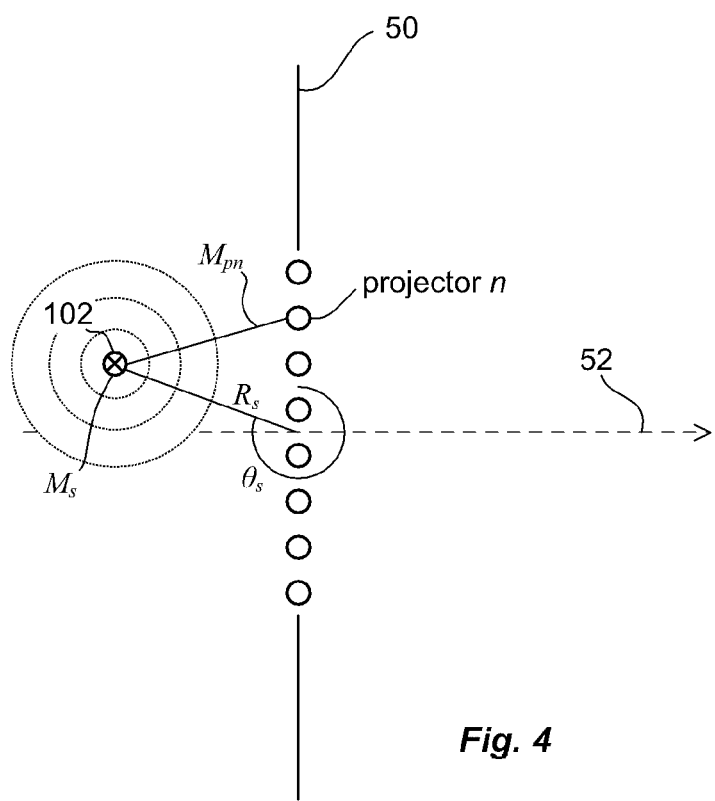
FIG. 4 shows the linear array of sonic projectors in an emulation of point source acoustic field diffraction through a baffled slot.

Reference is now made to FIG. 4, which shows the linear array of sonic projectors 14 in an emulation of point source acoustic field diffraction through a baffled slot. The labeling conventions discussed above in connection with FIG. 2 will be used herein. It will be noted that the endfire axis 50 is conceptually considered an infinite rigid baffle for these purposes. The linear array of N projectors is conceptually considered a virtual slot.

A virtual source 102 is defined at a virtual source location M. The projectors are each located at projector locations $M_{pn}$. The virtual source location is $M_s$ is considered to be in the plane defined by the endfire axis 50 and the broadside axis 52. The virtual source 102 has a range $R_s$ and bearing $\theta_s$ using the orientation convention given in connection with FIG. 2. The volume flow of the virtual source is represented by $\overline{Q}_s$.

Accordingly, the acoustic pressure generated by the virtual source at the $n^{th}$ projector location $M_{pn}$ is given by:

$$\overline{p}(M_{pn}) = j\rho\omega\overline{Q}_s \frac{e^{-ikR_{sn}}}{4\pi R_{sn}} \qquad (11)$$

In Equation (11), the term $R_{sn}$ is the distance between the projector location $M_{pn}$ and the virtual source location $M_s$.

For each projector location, this complex pressure value may be used to define a beamformer coefficient $\overline{B}_n$. Since we want the module of a beamformer coefficient to have a dimensionless value falling within the range [0-1], the term $jrw\overline{Q}_s/4\pi$ may be replaced by an arbitrary range $R_0$ to insure a dimensionless coefficient and a value bounded within the range [0-1]. Making this substitution results in the following expression for the beamformer coefficients:

$$\overline{B}_n = \left(\frac{R_0}{R_{sn}}\right) e^{-ikR_{sn}} \qquad (12)$$

It will be noted that this complex frequency-domain technique for determining suitable beamformer coefficients relies upon the wave vector k, and upon the distance of the virtual source away from each projector of the linear array of sonic projectors given by term $R_{sn}$.

In a first example illustration, the foregoing expressions may be used to define beamformer coefficients for isonifying a larger sector than is normally realized by a broadside beam. In this example illustration, a virtual source location is defined on the broadside axis at a range of 12.5λ from the array center O. As will be appreciated in light of the present description, the complex frequency-domain coefficients $\overline{B}_n$ result in adjustments to the projector volume flow in accordance with Equation (10); which is then realized through corresponding amplitude and phase adjustments to the driving signal for each projector in accordance with its beamformer coefficient.

Figure 5:
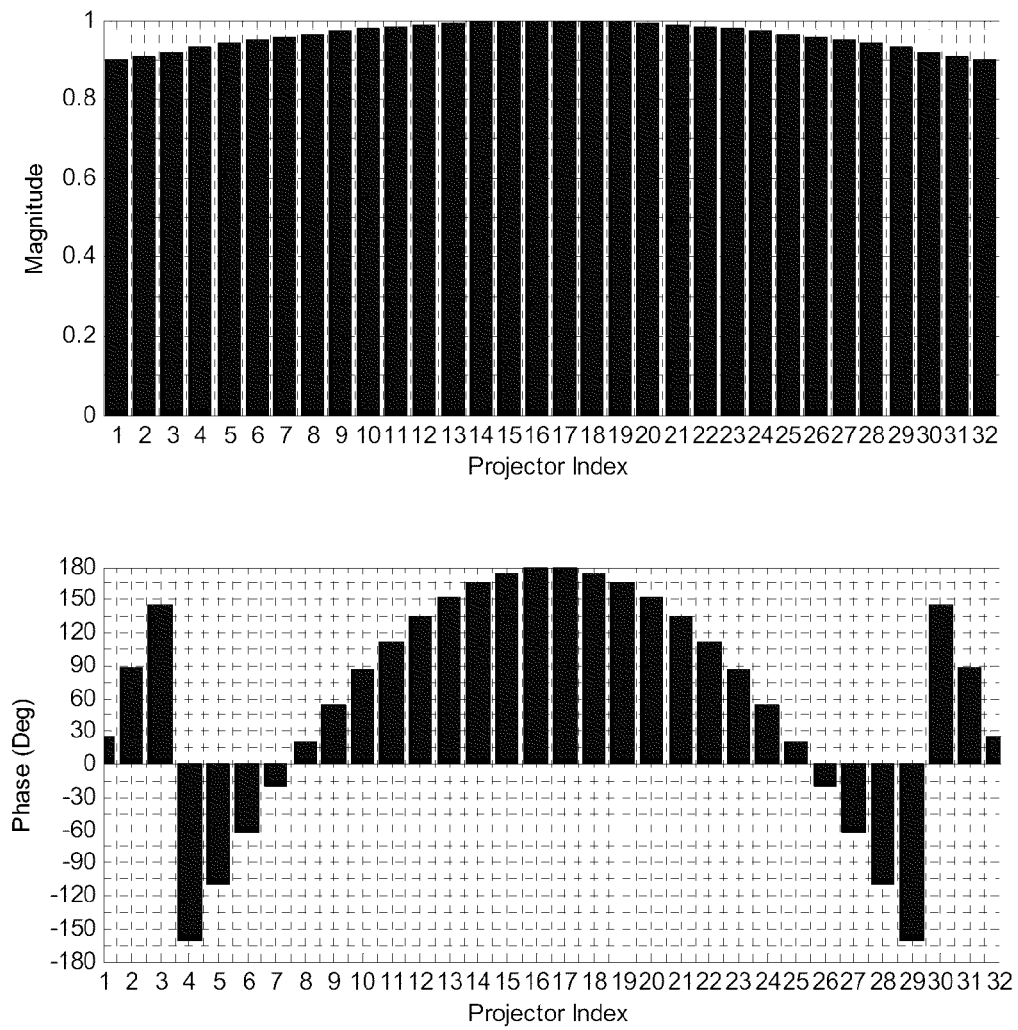
FIG. 5 shows graphs that illustrate the amplitude and phase adjustments resulting from the beamformer coefficients realized for a first example.
Figure 6:
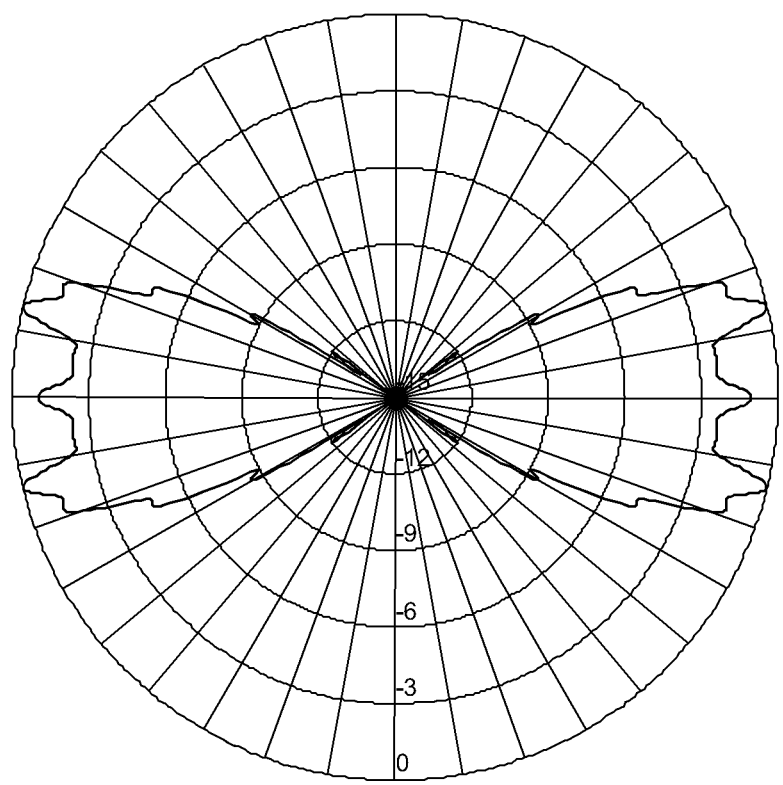
FIG. 6 shows a plot of the beampattern resulting from the use of the amplitude and phase adjustments of the first example.

FIG. 5 shows graphs that illustrate the scale and phase adjustments resulting from the beamformer coefficients realized for the present example with a broadside virtual source at a range of 12.5λ. The resultant beampattern is illustrated in FIG. 6. It will be noted that the beampattern normally associated with a broadside beam has been defocused, and that the resultant beam isonifies a significantly larger sector. The present example assumes a 32-projector array with an array length of 12.28λ, or about 0.4λ between adjacent projectors. The distance $R_{sn}$ between the virtual source and the first or last projector in the array is 13.93λ in this example.

In a second example illustration, the virtual source is moved towards the array center O; specifically to a virtual source location on the broadside axis at a range of 6λ. FIG.

Figure 8:
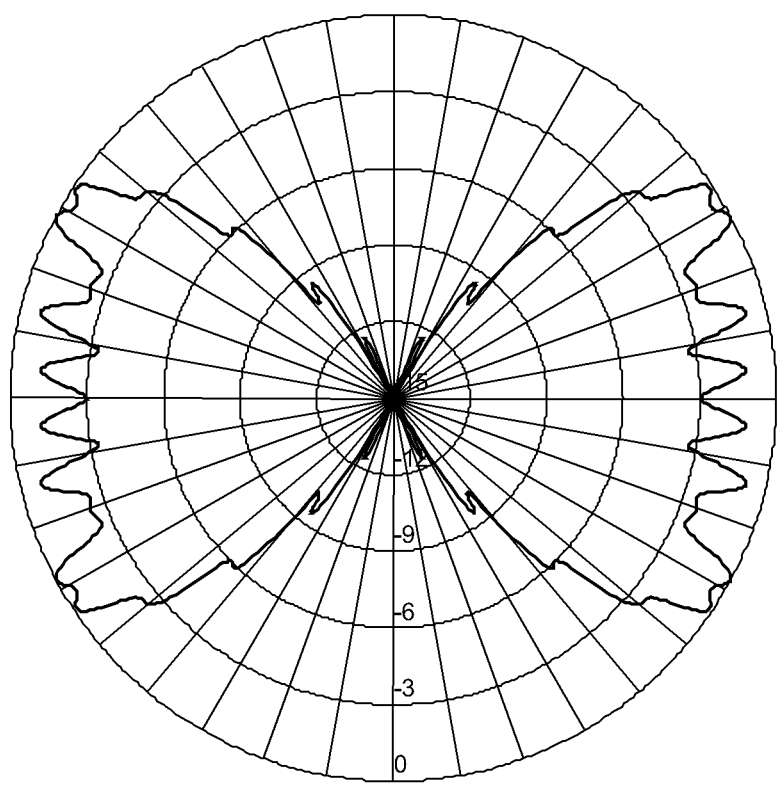
FIG. 8 shows a plot of the beampattern resulting from the use of the amplitude and phase adjustments of the second example.

7 shows graphs that detail the amplitude and phase adjustments specified by the resultant beamformer coefficients for this second example. It will be noted that the beamformer coefficients have specified a more significant amplitude adjustment, particularly for the sonic projectors at either end of the array. FIG. 8 shows the resulting beampattern for this second example. It will be noted that the beampattern is even more defocused than in the first example.

Using this technique, a beampattern of a desired width may be created by adjusting the virtual source distance from the array, and calculating the beamformer coefficients.

It will be noted from FIG. 8 that the beampattern has a "wavy" or ringing characteristic. This is consistent with the wavy beam pattern normally associated with diffraction phenomena. Ripples are due to the strong discontinuity of the volume flows' distribution along the endfire axis at both ends of the array. This effect may be undesirable and may be partially compensated for by shading the beamformer coefficients to attenuate those discontinuities. For example, the four outermost projectors (e.g. projectors 1, 2, N−1, and N) may be symmetrically scaled using two additional coefficients, $\alpha$ and $\beta$, as follows:

$$\begin{cases} \overline{B}_1 \leftarrow \alpha \overline{B}_1 \\ \overline{B}_N \leftarrow \alpha \overline{B}_N \end{cases} \quad (13)$$

$$\begin{cases} \overline{B}_2 \leftarrow \beta \overline{B}_2 \\ \overline{B}_{N-1} \leftarrow \beta \overline{B}_{N-1} \end{cases} \quad (14)$$

Figure 7:
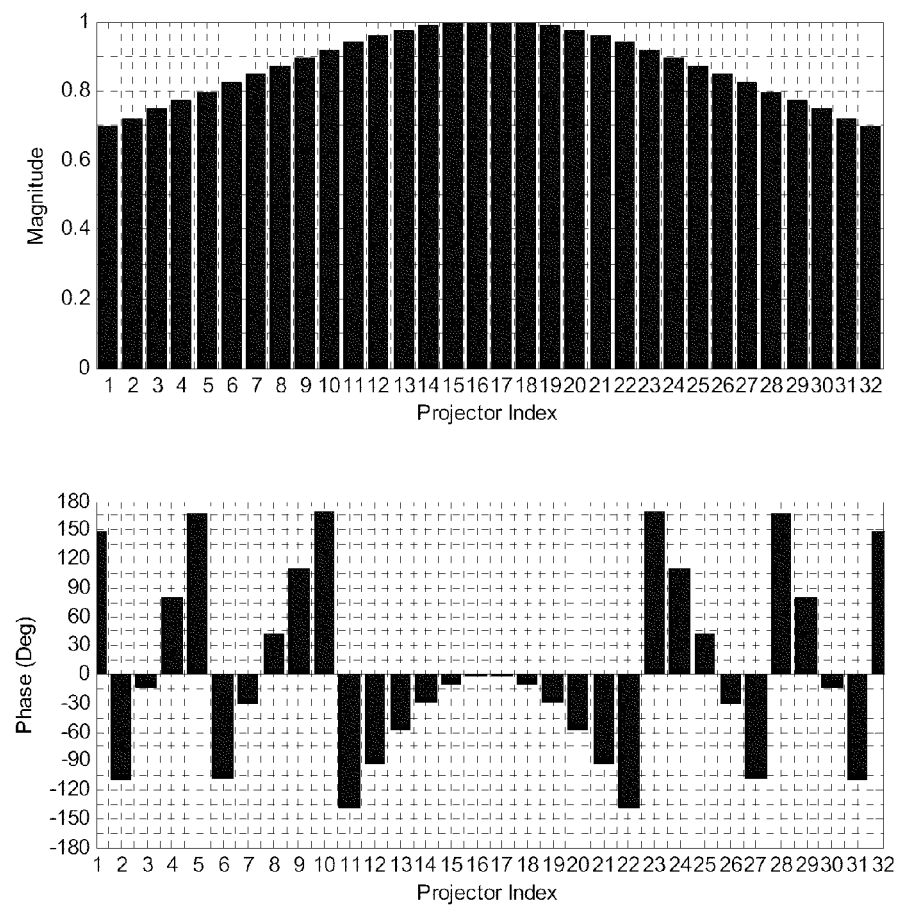
FIG. 7 shows graphs that illustrate the amplitude and phase adjustments resulting from the beamformer coefficients realized for a second example.
Figure 9:
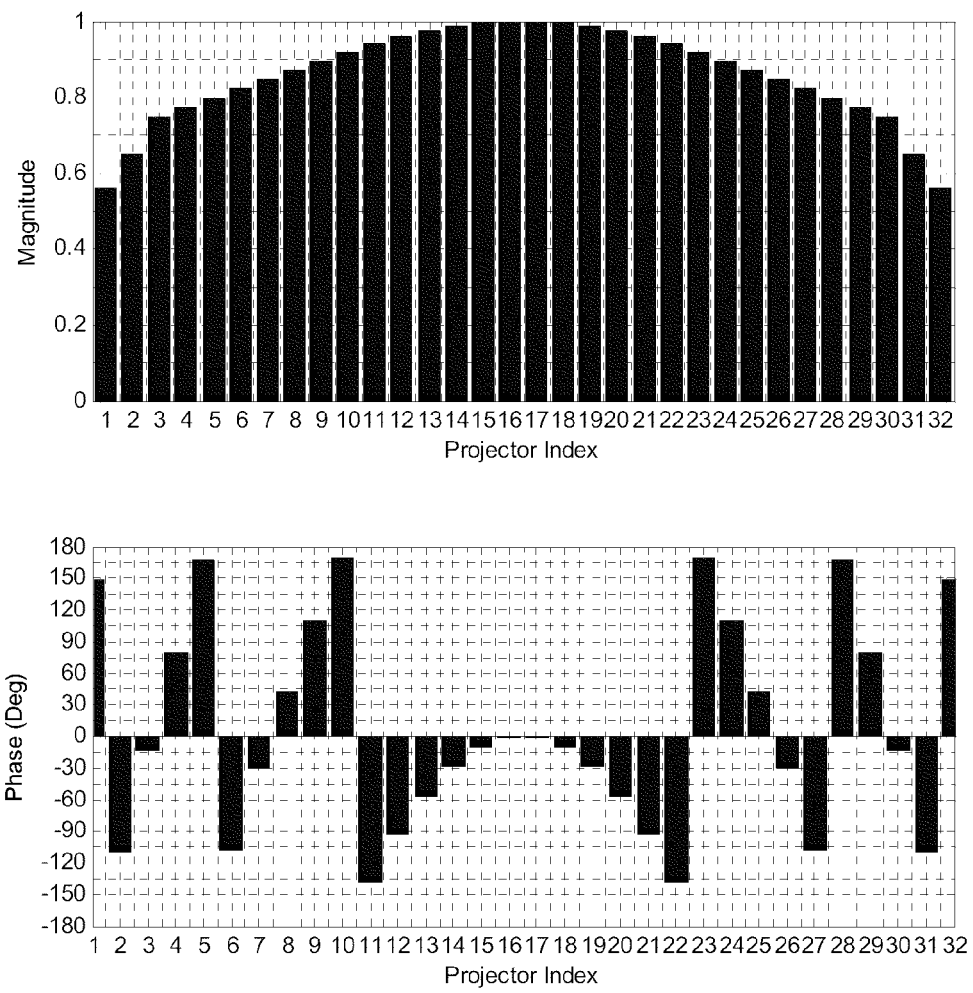
FIG. 9 shows graphs that illustrate the amplitude and phase adjustments resulting from the beamformer coefficients realized for a third example.
Figure 10:
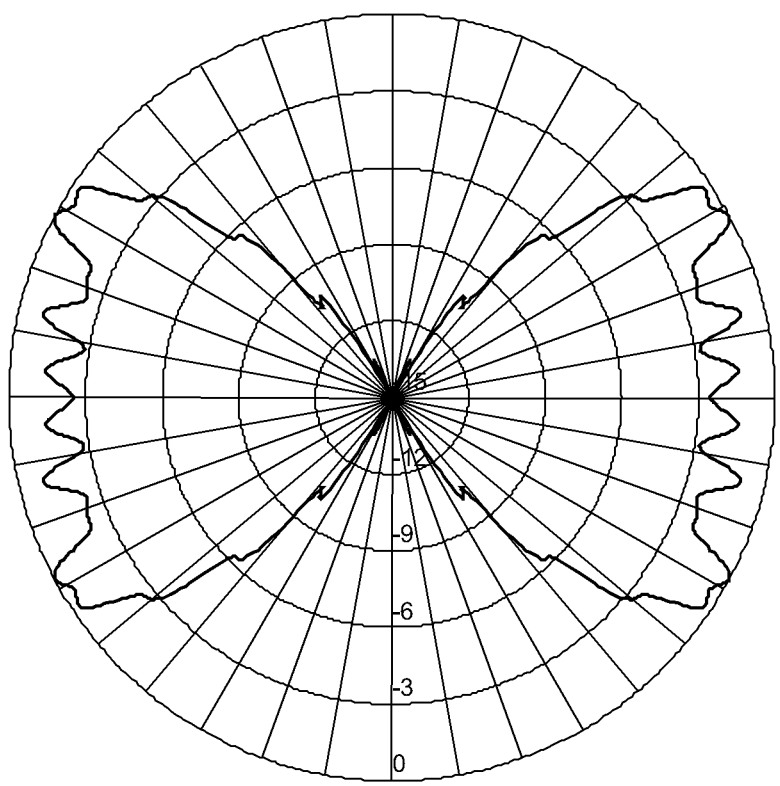
FIG. 10 shows a plot of the beampattern resulting from the use of the amplitude and phase adjustments of the third example.

A third example is shown in FIGS. 9 and 10. The third example uses the same virtual source location that was used in the second example with additional shading of the four end projectors using the values $\alpha=0.8$ and $\beta=0.9$. FIG. 9 shows graphs of the amplitude and phase adjustments specified by the beamformer coefficients. It will be noted that FIG. 9 is identical to FIG. 7 except in that the amplitude of projectors 1 and N is 0.8 of its previous level and the amplitude of projectors 2 and N−1 is 0.9 of its previous level. The resulting impact on the beam pattern is illustrated in FIG. 10. It will be noted that the wavy ringing effect, while still present, has been reduced somewhat. In particular, the shading operation has reduced the ripple level to within a 3 dB fluctuation range. Larger or smaller shading values may be used in other example implementations. More or fewer projectors may be shaded in some embodiments.

A fourth example will now be illustrated. In this fourth example illustration, the virtual source is moved off the broadside axis. In this case, the virtual source location is still at a range of $6\lambda$ from the array center O, as in the second example, but it has been rotated by 25 degrees. That is, the virtual source now has a bearing $\theta_s$ of 245 degrees (the previous three examples used a bearing of 270 degrees; recall that the bearing $\theta_s$ is measured clockwise from the tow direction endfire axis as illustrated in FIG. 1). In other words, the virtual source in this example is rotated 25 degrees to the aft from the broadside axis. Shading still applied, as in the third example.

Figure 11:
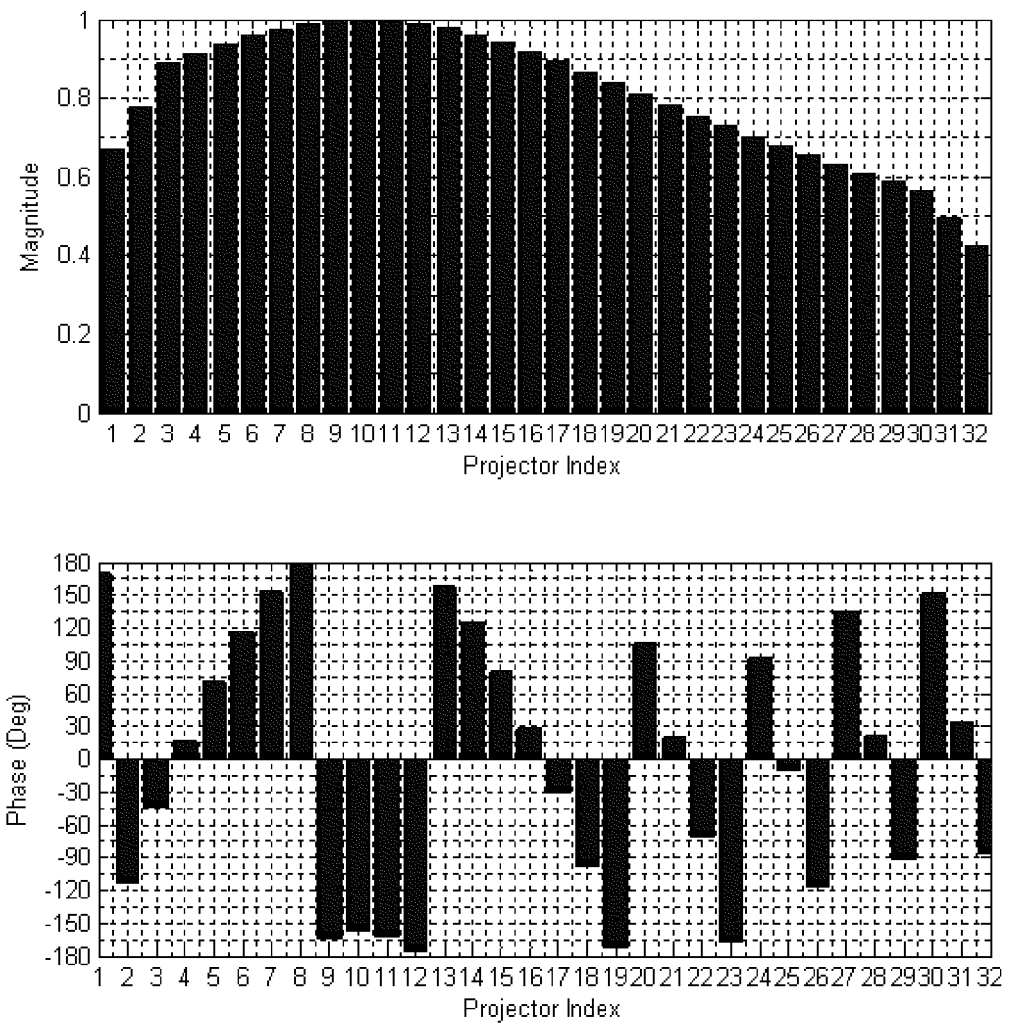
FIG. 11 shows graphs that illustrate the amplitude and phase adjustments resulting from the beamformer coefficients realized for a fourth example.

FIG. 11 shows graphs that detail the amplitude and phase adjustments specified by the resultant beamformer coefficients for this fourth example. It will be noted that the beamformer coefficients now result in non-symmetric amplitude and phase adjustments about the array center O. In particular, the driving signal is non-linearly stronger in the projectors towards the back of the array (aft), whereas those near the front (fore) are driven by a generally lower amplitude signal. Recall the numbering convention for projectors herein is that the numbering n=1 to N begins with the aft-most projector.

Figure 12:
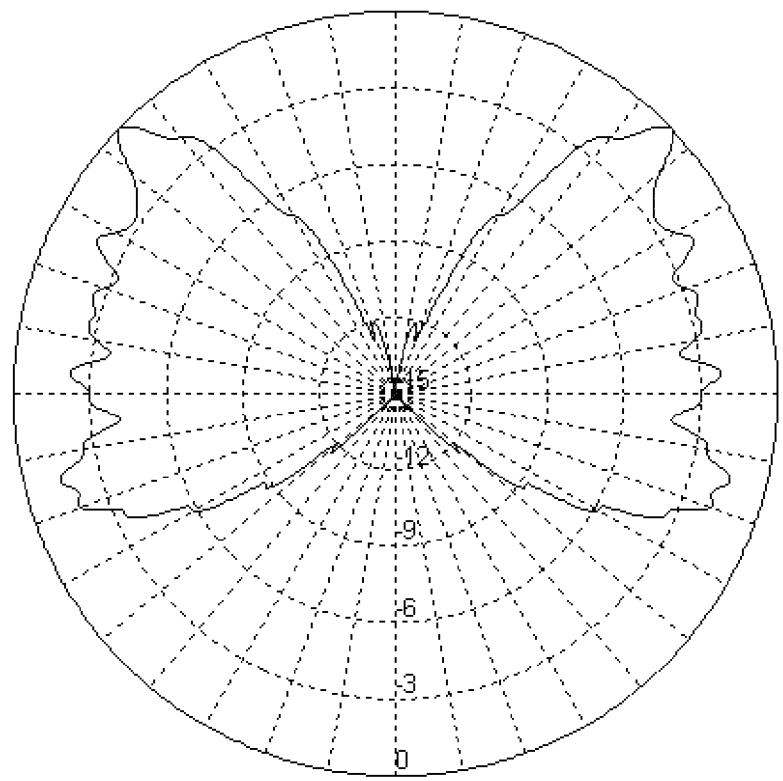
FIG. 12 shows a plot of the beampattern resulting from the use of the amplitude and phase adjustments of the fourth example.

FIG. 12 shows the resulting beampattern for this fourth example. It will noted that the shift of the virtual source towards the aft has resulted in a shift of the beampattern towards the front, or tow-direction.

Figure 13:
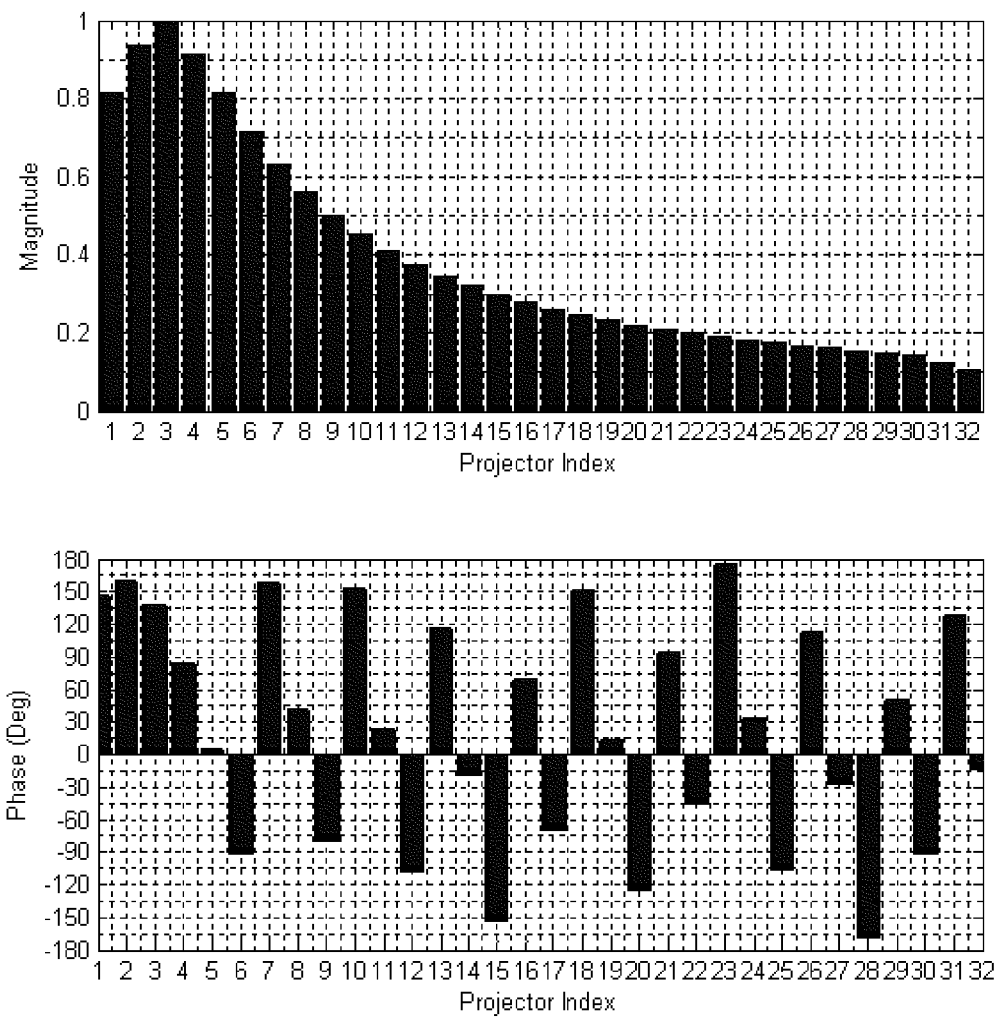
FIG. 13 shows graphs that illustrate the amplitude and phase adjustments resulting from the beamformer coefficients realized for a fifth example.
Figure 14:
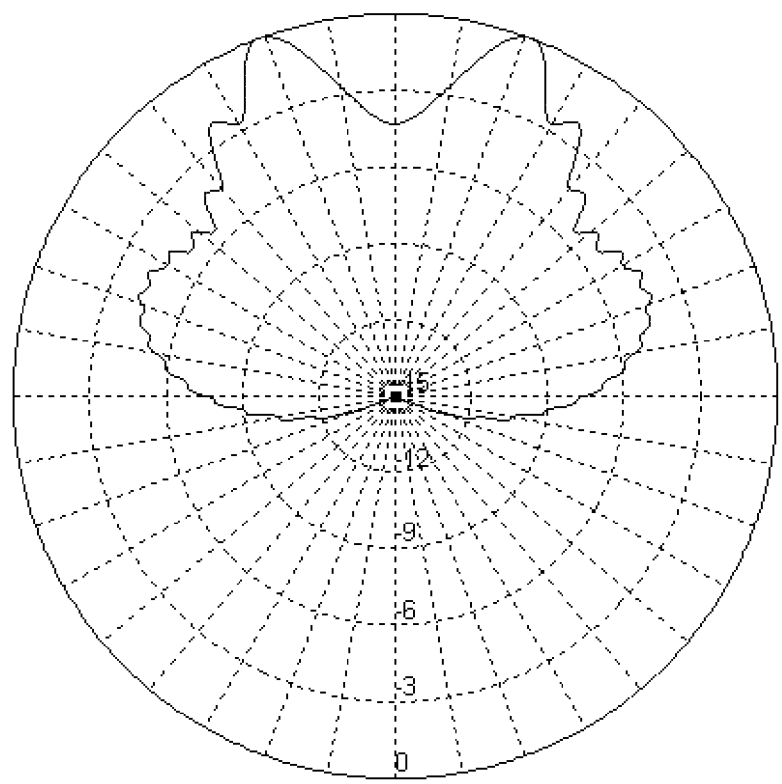
FIG. 14 shows a plot of the beampattern resulting from the use of the amplitude and phase adjustments of the fifth example.

FIGS. 13 and 14 illustrate a fifth example, in which the virtual source from the fourth example is further rotated aft by another 50 degrees (75 degrees aft of broadside) to a bearing $\theta_s$ of 195 degrees (i.e. only 15 degrees away from the endfire axis). It will be noted that a significant shift in the amplitude of driving signals to the projectors results. It will also be appreciated that this underutilizes many of the projectors to some extent, which will be discussed further below. FIG. 14 shows the resulting beampattern, which, it will be noted, is strongly oriented in the forward direction but still remains defocused, isonifying a wide sector spanning over 180 degrees.

Figure 15:
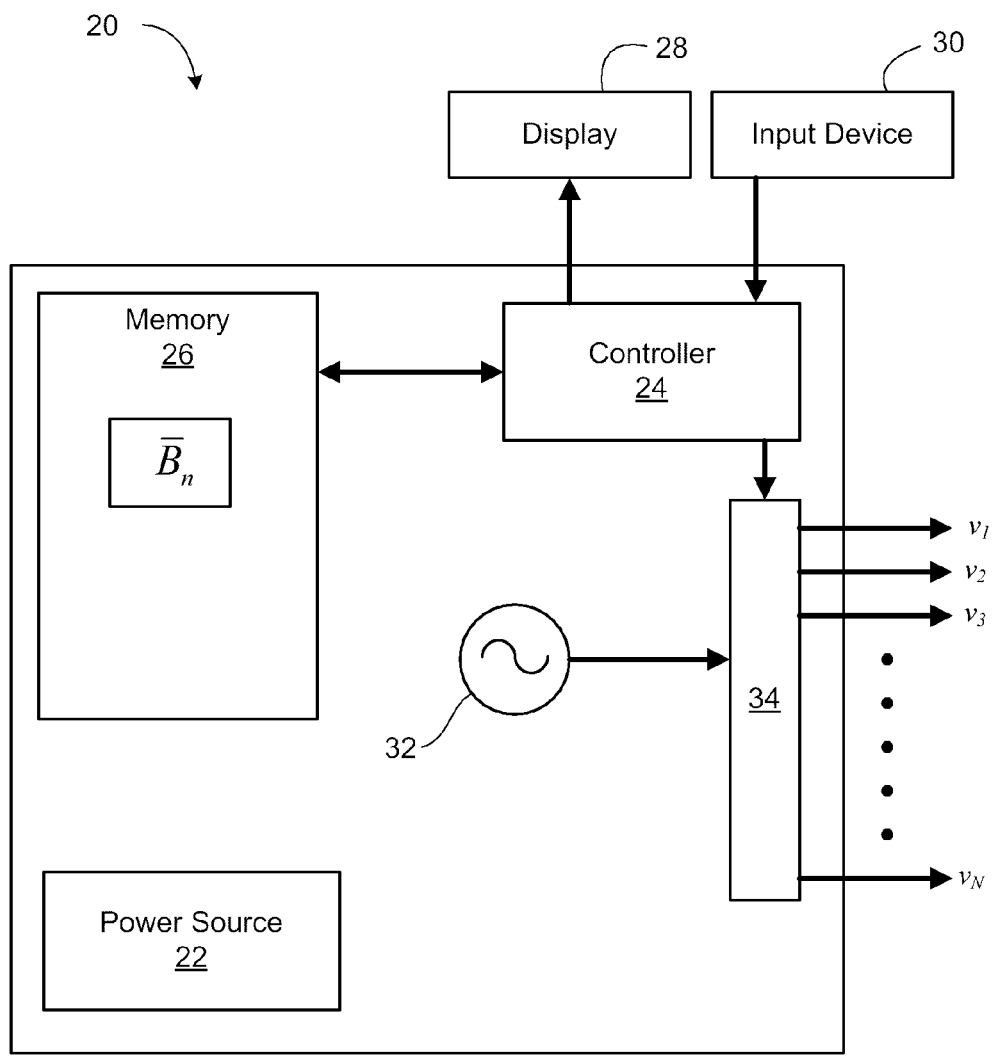
FIG. 15 shows, in block diagram form, an example embodiment of a control system for driving a linear array of sonic projectors.

Reference is now made to FIG. 15, which shows, in block diagram form a simplified example of the control system 20. The control system 20 may include an internal or external power source 22, a controller 24, a memory 26, an internal or external display 28, and one or more input devices 30. The control system 20 may be implemented as an application-specific computing device, or as a suitably-programmed general-purpose computer, or as an integrated software/hardware component of general computing and signaling infrastructure of the ship 12 (FIG. 1). It will be appreciated that some aspects, such as the display 28 and input devices 30, for example, may be part of other computing or control equipment within the ship 12.

In this example embodiment, the control system 20 includes the memory 26 storing at least one set of beamformer coefficients $\overline{B}_n$. The beamformer coefficients $\overline{B}_n$, although derived through a Huygens Principle-based frequency-domain analysis and expressed in as a complex number, may, in one embodiment, be stored as two sets of real numbers: the set of N amplitude adjustments and the set of N phase adjustments. The amplitude adjustments may be scaling factors in the range 0 to 1, or may, in some cases, specify actual drive signal amplitudes. The phase adjustments may be expressed in radians, degrees, or in any other suitable form. The memory 26 may include volatile and non-volatile memory.

The control system 20 further includes a signal generator 32. The signal generator 32 generates a drive signal at a desired frequency. The drive signal in this example embodiment is a sinusoid. Any number of discrete or integrated components, digital or analog, may be used to generate a sinusoidal signal, as will be understood by those skilled in the art. The control system 20 then includes a scale and phase stage 34. The scale and phase stage 34 applies the amplitude scaling and phase adjustment specified by the beamformer coefficients so as to produce the adjusted drive voltages $v_1$ to $v_N$ for driving the N sonic projectors 14 (FIG. 1). The scale and phase stage 34 may be implemented using analog components, digital components, or both.

The scale and phase stage 34 operates under control of the controller 24. The controller 24 causes the scale and phase stage 34 to apply the amplitude and phase adjustment to each $n^{th}$ drive signal $v_n$ in accordance with the beamformer coefficients $\overline{B}_n$.

Although this example shows a single signal generator 32 with the scale and phase stage 34 for generating the N drive signals; it will be understood that in some implementations multiple signal generators may be used, up to N generators, provided their relative amplitudes and phases are controlled by the controller 24 in accordance with the beamformer coefficients $\overline{B}_n$.

In one example embodiment, the memory 26 stores a single set of beamformer coefficients $\overline{B}_n$ predetermined using the above-described process to realize a desired beampattern. In another example embodiment, the memory 26 stores two or more sets of beamformer coefficients $\overline{B}_n$ predetermined using the above-described process to realize two or more corresponding desired beampatterns. In such an embodiment, the controller 24 may be configured to accept user or operator input via the input device 30 selecting one or more of the beamformer coefficients $\overline{B}_n$ for use in a particular situation. The controller 24 may be further configured to output information regarding the beampatterns associated with the stored sets of beamformer coefficients $\overline{B}_n$, such as, but not limited to, polar diagrams illustrating the beampatterns corresponding to each set of beamformer coefficients $\overline{B}_n$.

In yet another example embodiment, the controller 24 may be configured to perform the process described above to dynamically generate a set of beamformer coefficients $\overline{B}_n$ based on a virtual source location input via the input device. In one example implementation, a virtual source location may be selected or specified using the input device, for example a touch screen, keyboard, pointing device, touchpad, etc. In one implementation, a range and bearing for the virtual source may be input to the controller 24, either explicitly or through selection of a coordinate location on a display of a polar chart, for example.

The controller 24 may be configured to generate the beamformer coefficients $\overline{B}_n$ based on a selected or specified virtual source, and may further be configured to display the resulting beampattern and, in some cases, the beamformer coefficients $\overline{B}_n$ and/or the explicit amplitude and phase adjustments on the display 28. The controller 24 may then receive further input via the input device 30 authorizing use of the generated beamformer coefficients $\overline{B}_n$ to drive the array; or may receive input cancelling the request or modifying the virtual point source location.

The controller 24 may be configured to automatically determine the optimum combination of virtual sources required to generate a specific beampattern requested by the operator via the input device 30. It may further provide the operator the option of adjusting or redefining the sector to be insonified, and consequently recalculating the beamformer coefficients $\overline{B}_n$.

In one embodiment, the control system 20 may be configured to receive an input specifying a particular bearing range to isonify. The ideal beampattern for isonifying a specified sector is 100 percent within the sector and 0 percent outside the sector. Naturally this cannot be achieved in practice; however, the control system 20 and, in particular, the controller 24 may be configured to automatically determine a best beampattern for isonifying a requested sector (where the requested sector may be specified by a bearing range—e.g. from 10 degrees to 25 degrees). In this respect the controller 24 may search for a set of beamformer coefficients that result in a beampattern with the minimum error from the "ideal". The controller 24 may evaluate beampatterns resulting from a single virtual source or multiple virtual sources. Moreover, as described below, the controller 24 may evaluate beampatterns resulting from more complicated waveforms, having multiple frequency components each with its own set of beamformer coefficients.

The controller 24 may be configured to search for an optimal beampattern by computing an error function between the ideal beampattern and the beampattern resulting from a set of beamformer coefficients. The virtual source(s) may be adjusted in location until the optimal beampattern is found based on a minimization function. The error calculation may be evaluated as the square of the absolute value of the difference between the ideal and the modeled beampatterns, with an error minimization algorithm used to find the optimal beamformer coefficients. For example, the error minimization algorithm may employ simulated annealing, or other computation techniques.

Figure 20:
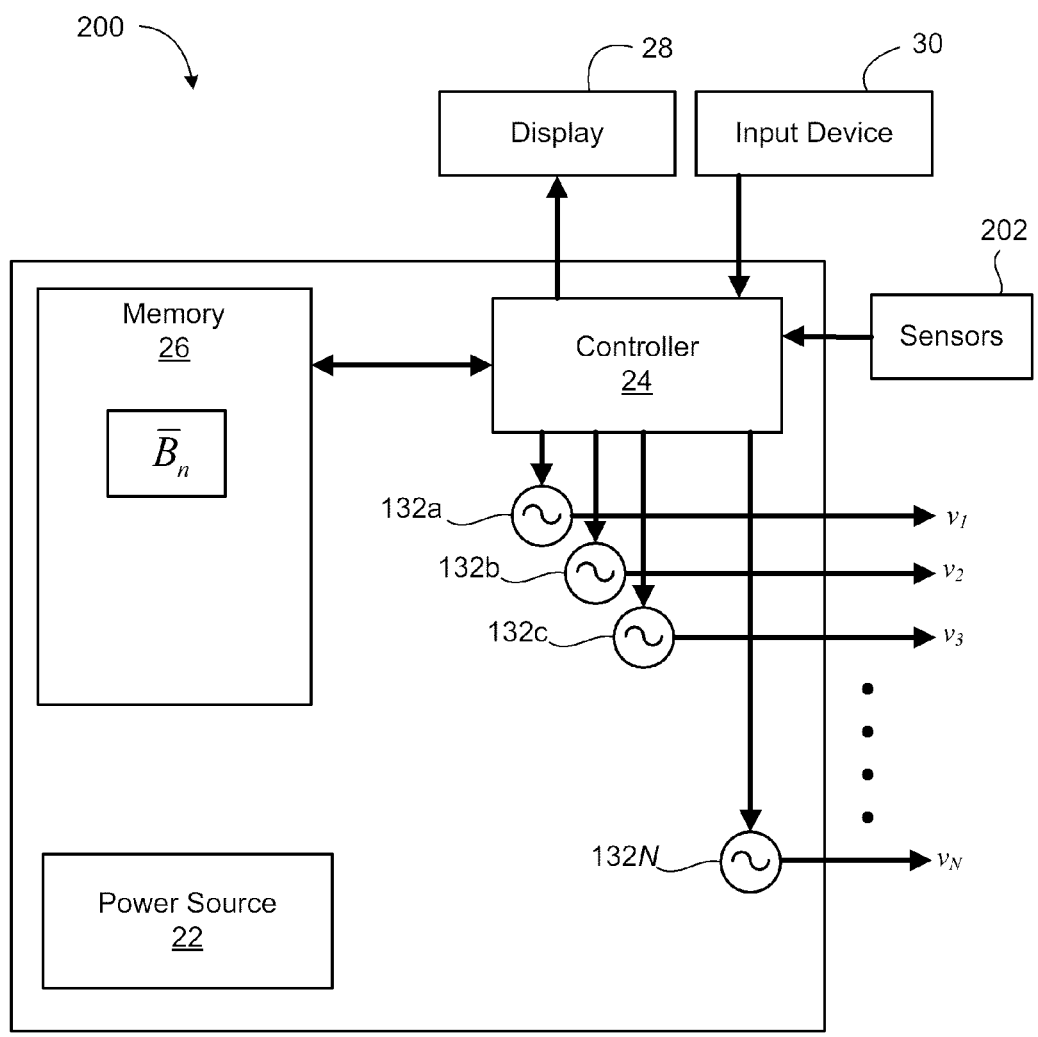
FIG. 20 shows a block diagram of another embodiment of a control system in accordance with the present application.

Reference is now made to FIG. 20, which shows a block diagram of another example control system 200 in accordance with the present application. In this example embodiment, the control system 200 is configured to handle more complex waveforms than a simple sinusoid or continuous wave pulse. The defocusing algorithm described above is for a given frequency f. However, if a more general waveform (like, for example, a Frequency Modulated Pulse) is to be used, each frequency component of the waveform can be treated separately using the above-described defocusing algorithm and a set of beamformer coefficients can be computed for each frequency component. The frequency components of the waveform may be obtained by performing a spectral transform of the waveform, such as a Fourier Transform. Each frequency component is scaled and phased in the frequency domain by its associated beamformer coefficients and the defocused driving waveform is then realized by an inverse spectral transform to convert the adjusted frequency components back to the time domain. For example, an inverse Fourier Transform may be used. The control system 200 may then generate the N driving voltages to be sent on the projectors.

In this embodiment, the control system 200 includes N waveform generators 132 (shown individually as 132a, 132b, . . . , 132N) for generating the driving voltages for the N projectors. The controller 24 together with the waveform generators 132 are configured to synthesis complex waveforms. For example, the controller 24 and waveform generators 132 may be configured to generate signals having multiple frequency components.

The controller 24 causes the waveform generators 132 to synthesize driving signals ($v_1, v_2, \ldots, v_N$). Any number of components for synthesizing waveforms may be employed in implementing specific embodiments of the control system 200.

In one embodiment, the control system 200 stores sets of beamformer coefficients previously calculated for the frequency components of a particular desired waveform based on a virtual source(s) location. The control system 200 applies the beamformer coefficients to scale and phase the frequency components in the frequency domain, and then inverse transforms the frequency components to realize the time domain representation of the defocused waveform.

In this example embodiment, the control system 200 further includes sensors 202. Sensors 202 may measure a number of environmental conditions and parameters and may provide data signals to the controller 24 for use by the controller 24. Example sensors include sensors for measuring temperature, salinity, depth, sound speed, etc. The controller 24 may use these measurements to dynamically recalculate beamformer coefficients to maintain beam pattern characteristics whilst moving and encountering environmental changes.

As will be outlined below, further input may be received by the controller 24 specifying steering parameters for steering a beampattern.

As noted above in connection with FIGS. 11-14, the beampattern may be steered by rotating the location of the virtual source. However, as shown in FIGS. 13 and 14, this can result in an underutilization of a significant number of the projectors, which results in lower overall volume flow and, thus, a lower source power level.

Another option for beam steering is the use of phasors. Phasor-based steering of a beam pattern in this embodiment involves modifying the beamformer coefficients by a set of steering phasors $\overline{\Phi}_n$, as follows:

$$\overline{B}_n \leftarrow \overline{B}_n \overline{\Phi}_n \text{ for } n=1 \text{ to } N \quad (15)$$

The set of steering phasors may be defined as follows:

$$\overline{\Phi}_n = e^{-jn\omega \sin(\phi_s d/c)} \quad (16)$$

In Equation (16), n is the projector index, d is the projector spacing, and $\Phi_s$ is the steering angle. The steering angle $\Phi_s$ is defined as the angle between broadside axis and the desired steering direction, counter-clockwise oriented.

According, the above-described process may be used to realize a set of beamformer coefficients $\overline{B}_n$ that generate a wide-sector defocused beampattern, possibly centered at the broadside axis, but not necessarily. A set of steering phasors $\overline{\Phi}_n$ is also generated using Equation (16) to direct the defocused beampattern to a particular sector (or away from a sector that should not be isonified).

As a sixth example, consider the beampattern generated in the third example, i.e. a range of 6λ, bearing of 270 degrees (broadside), and shading of 0.9 and 0.8, illustrated in FIGS. 9 and 10. This beampattern may be steered by finding the set of phasors and setting a steering angle $\Phi_s$ of 25 degrees.

Figure 16:
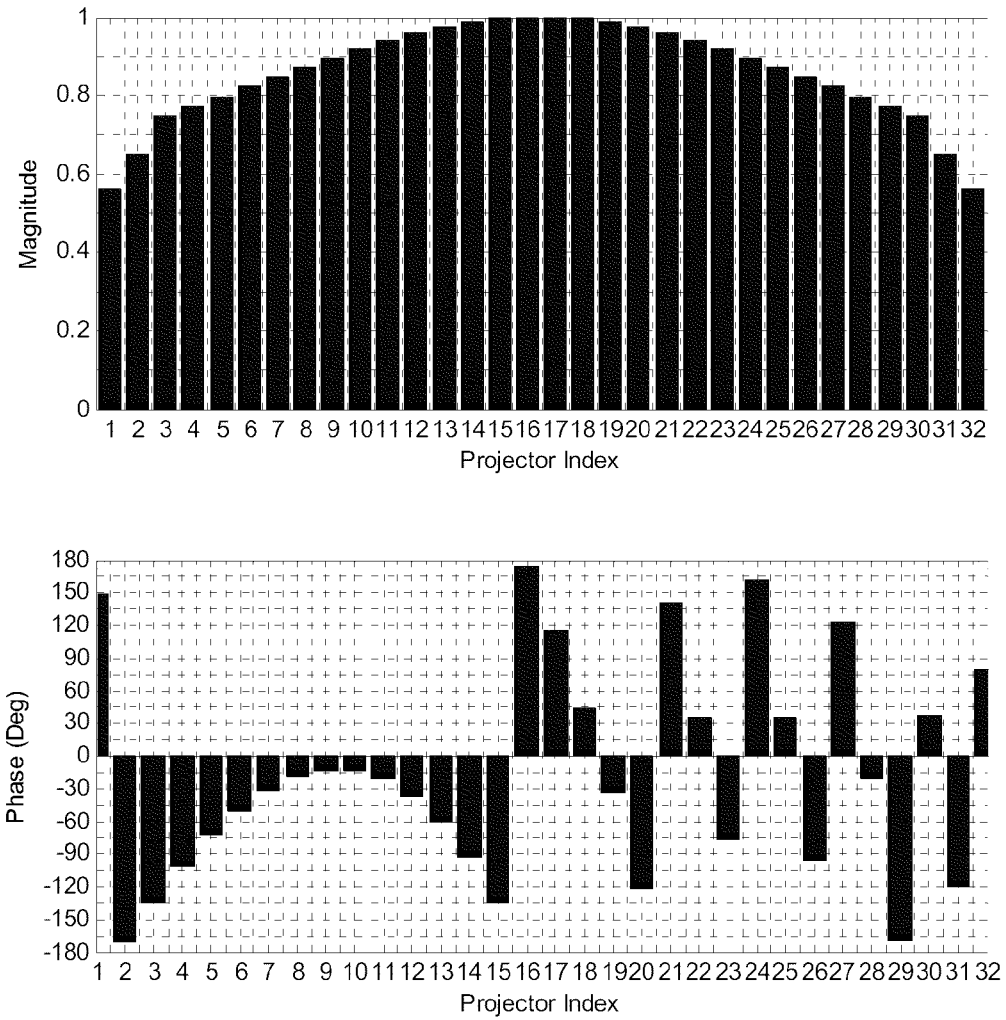
FIG. 16 shows graphs that illustrate the amplitude and phase adjustments resulting from the beamformer coefficients realized for a sixth example.
Figure 17:
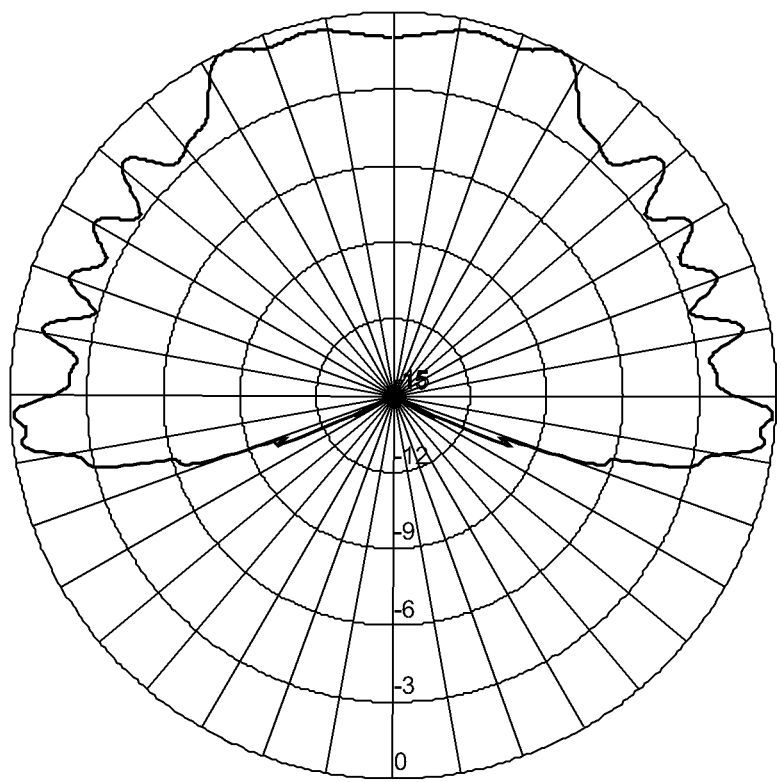
FIG. 17 shows a plot of the beampattern resulting from the use of the amplitude and phase adjustments of the sixth example.

FIGS. 16 and 17 show charts of the amplitude and phase adjustments and a plot of the beampattern, respectively, for this sixth example. It will be noted that the amplitude adjustments in FIG. 16 are identical to the amplitude adjustments of FIG. 9, since the steering phasors $\overline{\Phi}_n$ affect only the phase adjustments. The resulting beampattern illustrated in FIG. 17 is an approximately 200 degree wide sector beam oriented in the tow direction.

Referring again to FIG. 15, one or more sets of steering phasors $\overline{\Phi}_n$ may be predetermined and stored in memory 26 for use by the controller 24. In some embodiments the controller 24 may be configured to dynamically calculate a set of steering phasors $\overline{\Phi}_n$ for use with a selected beam pattern. In one embodiment, the controller 24 may be configured to automatically calculate one or more sets of steering phasors for sweeping a selected beam pattern based on the width of the beampattern, wherein narrower beam patterns would result in the calculation of sufficient sets of steering phasors to permit a full sweep, and wider defocused beam patterns would require fewer sets of steering phasors to cover full azimuth.

The combination of beamformer coefficients for controlling beam width and steering phasors for controlling direction provide a significant degree of fine control over the area isonified by a linear projector array. This enables faster sweeps and increased ping repetition rate. It also enables avoidance of particular sectors, if desired.

In one possible embodiment, the foregoing defocusing process may be modified to achieve near omni-directionality by designing a beamformer at a design frequency $f_d$, but drive the array at a lower working frequency $f_w$, where $f_w < f_d$.

In general, the lower the frequency, the lower the directivity in an acoustic environment. Therefore a beamformer that generates a sector-beam of beamwidth $BW_d$ at frequency $f_d$ may be expected to produce a wider beam at an even lower frequency.

Figure 18:
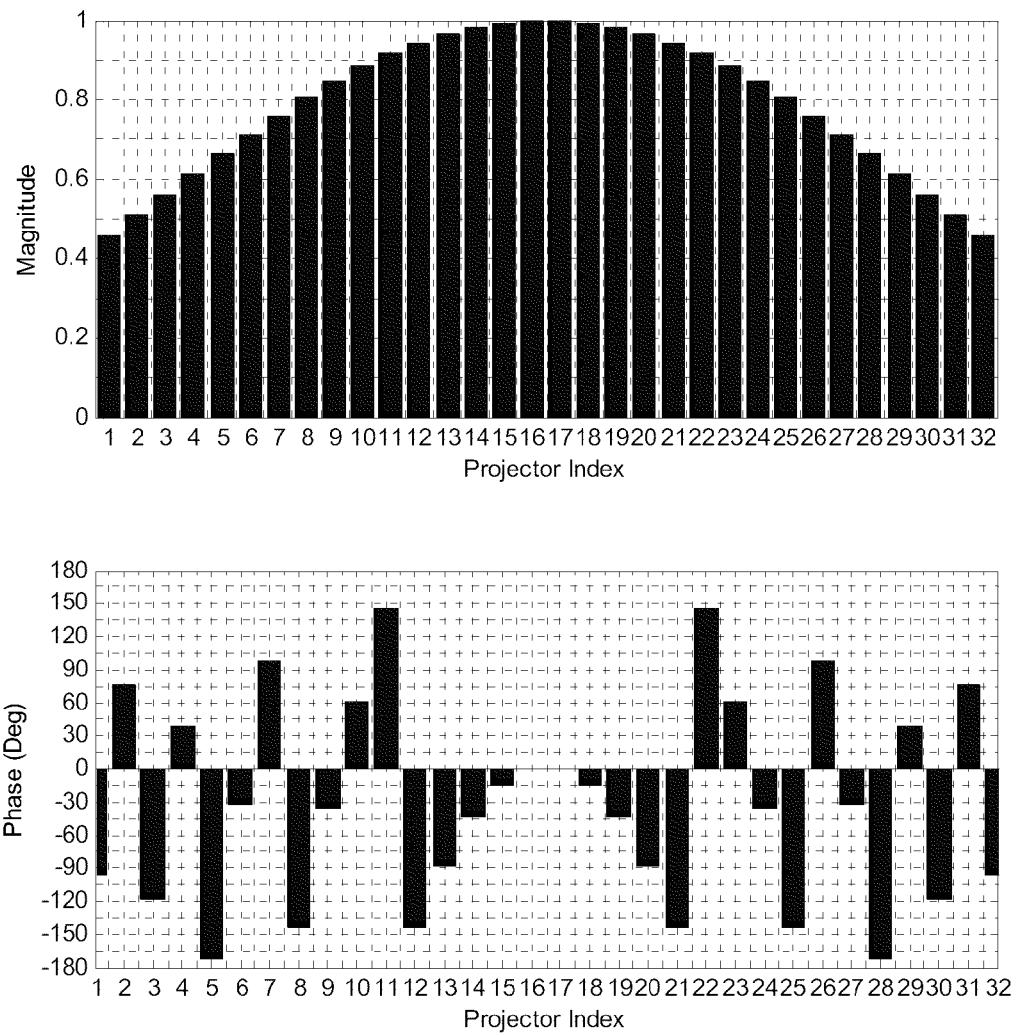
FIG. 18 shows graphs that illustrate the amplitude and phase adjustments resulting from the beamformer coefficients realized for a seventh example.
Figure 19:
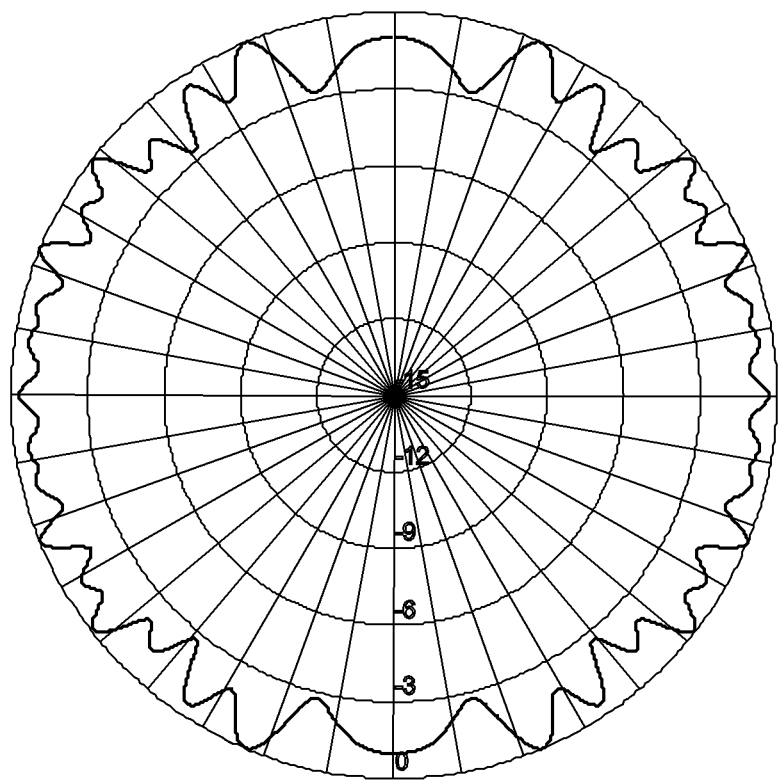
FIG. 19 shows a plot of the beampattern resulting from the use of the amplitude and phase adjustments of the seventh example.

A seventh example is illustrated in FIGS. 18 and 19. In this seventh example, two closely spaced virtual sources have been used to control ripple effects through interference. The two sources are about 0.88λ apart at ranges of $R_{sn1}=14.56\lambda$ and $R_{sn1}=15.44\lambda$. No steering or shading has been applied and the virtual sources are located on the broadside axis.

In this seventh example, the beamformer coefficients reflected in FIG. 18 are designed for a design frequency $f_d$ but the beampattern shown in FIG. 19 is the beampattern that results from use of those beamformer coefficients with a working frequency $f_w$ that is half the design frequency $f_d$. It will be noted that the beampattern is nearly omni-directional.

Those ordinarily skilled in the art will appreciate that the foregoing processes may be modified in some respects without changing the functionality. It will also be appreciated from the foregoing description that the control system may include computer-executable code or instructions that, when executed, configured the control system (more particularly, a processor or other computing device) to execute one or more of the operations described herein, including the determination of beamformer coefficients, the determination of steering phasors, and/or the control of a drive signal. Computer-executable instructions may be embodied in software form stored in memory in some implementations for execution by a processor. In some cases, the computer-executable instructions may be embodied in an application-specific integrated circuit, field programmable gate array, or other special purpose computing device.

Certain adaptations and modifications of the invention will be obvious to those skilled in the art in light of the present description, as will certain details of possible implementations. Therefore, the above discussed embodiments are considered to be illustrative and not restrictive, the scope of the invention being indicated by the appended claims rather than the foregoing description.

What is claimed is:

1. A towed sonic array system, comprising:
a linear array of sonic projectors;
a linear array of receivers; and
a control system configured to drive the sonic projectors,
wherein the control system is configured to drive each of the sonic projectors with a drive signal modified by an amplitude adjustment and a phase adjustment for that sonic projector,
wherein the control system includes a memory containing a beamformer coefficient for each sonic projector, each beamformer coefficient comprising the amplitude adjustment and phase adjustment for its respective sonic projector, and
wherein the beamformer coefficients have been obtained using the expression:

$$\overline{B}_n = \left(\frac{R_0}{R_{sn}}\right) e^{-ik R_{sn}}$$

wherein n is an index from 1 to the number of projectors, the beamformer coefficients are $\overline{B}_n$, $R_0$ is a coefficient to normalize the beamformer coefficients to the range 0 to 1, $R_{sn}$ is the distance from the virtual source to sonic projector n, and k is a wave vector given by $k=2\pi/\lambda$, wherein $\lambda$ is an acoustic wavelength given by $\lambda=c/f$ wherein f is the frequency of the drive signal and c is the speed of sound.

2. The towed sonic array system claimed in claim 1, wherein a modulus of each beamformer coefficient defines its respective amplitude adjustment and wherein a phase of each beamformer coefficient defines its respective phase adjustment.

3. The towed sonic array claimed in claim 1, wherein the drive signal includes two or more frequency components, and wherein the control system includes a set of beamformer coefficients for each of the frequency components, and wherein, for each sonic projector, the control system is configured to apply the amplitude adjustment and phase adjustment to each frequency component in a frequency domain and to apply an inverse spectral transform to the adjusted frequency components for that sonic projector to realize a defocused drive signal for that sonic projector.

4. The towed sonic array claimed in claim 1, wherein the phase adjustment for each sonic projector is based upon the phase of the corresponding beamformer coefficient for that sonic projector and a corresponding steering phasor for that sonic projector.

5. The towed sonic array claimed in claim 1, wherein the control system is configured to receive an input specifying a location for the virtual source relative to the linear array of projectors, and wherein the control system is configured to determine the distance from each sonic projector to the virtual source location and to calculate the amplitude adjustment and phase adjustment for each sonic projector therefrom.

6. The towed sonic array claimed in claim 1, wherein each amplitude adjustment is inversely proportional to the distance from the virtual source to the respective sonic projector, and wherein each phase adjustment in radians is proportional to the distance from the virtual source to the respective sonic projector.

7. The towed sonic array claimed in claim 6, wherein each phase adjustment is defined, in radians, as a wave vector multiplied by the distance from the virtual source to the respective sonic projector, and the wave vector is $k=2\pi/\lambda$, wherein $\lambda$ is an acoustic wavelength given by $\lambda=c/f$ wherein f is a frequency of the drive signal and c is the speed of sound.

8. The towed sonic array claimed in claim 1, wherein the amplitude adjustments and phase adjustments are defined based upon a design frequency for the drive signal, and wherein the drive signal has a working frequency lower than the design frequency.

9. A method of defocusing a beampattern of a towed sonic array, the towed sonic array including a linear array of sonic projectors and a linear array of receivers, the method comprising:
determining a beamformer coefficient for each sonic projector, wherein each beamformer coefficient comprises an amplitude adjustment and a phase adjustment for its corresponding sonic projector; and
driving each of the sonic projectors with a drive signal modified by the amplitude adjustment and the phase adjustment for that sonic projector, wherein the beamformer coefficients for each of the sonic projectors are calculated in accordance with the expression:

$$\overline{B}_n = \left(\frac{R_0}{R_{sn}}\right)e^{-ikR_{sn}}$$

wherein n is an index from 1 to the number of projectors, the beamformer coefficients are $\overline{B}_n$, $R_0$ is a fixed coefficient, $R_{sn}$ is the distance from the virtual point source to projector n, and k is a wave vector given by $k=2\pi/\lambda$, wherein $\lambda$ is the acoustic wavelength given by $\lambda=c/f$ wherein f is the frequency of the drive signal and c is the speed of sound.

10. The method claimed in claim 9, wherein a modulus of each beamformer coefficient defines its respective amplitude adjustment and wherein a phase of each beamformer coefficient defines its respective phase adjustment.

11. The method claimed in claim 9, wherein the drive signal includes two or more frequency components, and wherein determining includes, for each sonic projector, determining an amplitude adjustment and a phase adjustment for each of the frequency components, and wherein driving comprises applying the amplitude adjustment and phase adjustment to each frequency component in a frequency domain and applying an inverse spectral transform to the adjusted frequency components for that sonic projector to realize a defocused drive signal for that sonic projector.

12. The method claimed in claim 9, wherein determining the phase adjustment for each sonic projector is further based upon a corresponding steering phasor for that sonic projector.

13. The method claimed in claim 9, further comprising receiving an input specifying a location for the virtual source relative to the linear array of projectors, and wherein determining includes determining the distance from each sonic projector to the virtual source location and calculating the amplitude adjustment and phase adjustment for each sonic projector therefrom.

14. The method claimed in claim 9, further comprising receiving an input specifying a sector to be insonified and automatically computing the beamformer coefficients for realizing a beampattern isonifying the specified sector, wherein automatically computing comprises finding the beamformer coefficients that minimize error between an ideal beampattern for isonifying the specified sector and a beampattern resulting from the beamformer coefficients.

15. The method claimed in claim 9, wherein determining includes calculating each amplitude adjustment as inversely proportional to the distance from the virtual source to the respective sonic projector, and calculating each phase adjustment, in radians, as proportional to the distance from the virtual source to the respective sonic projector.

16. The method claimed in claim 9, wherein determining the amplitude adjustments and phase adjustments comprising determining based upon a design frequency for the drive signal, and wherein the drive signal has a working frequency lower than the design frequency.

* * * * *

UNITED STATES PATENT AND TRADEMARK OFFICE
CERTIFICATE OF CORRECTION

PATENT NO. : 9,551,802 B2  Page 1 of 1
APPLICATION NO. : 13/822595
DATED : January 24, 2017
INVENTOR(S) : Oliver Beslin It is certified that error appears in the above-identified patent and that said Letters Patent is hereby corrected as shown below:

In the Claims

Column 14, Line 13 (Claim 9): Insert the word --sonic-- between the words "to" and "projector"

Signed and Sealed this
Twenty-third Day of May, 2017

Michelle K. Lee
*Director of the United States Patent and Trademark Office*